Patented Sept. 6, 1927.

1,641,598

UNITED STATES PATENT OFFICE.

GEORGE J. MILLER, OF DOUGLAS, ARIZONA.

PROCESS OF RECLAIMING RUBBER.

No Drawing. Application filed December 22, 1926. Serial No. 156,526.

My invention relates to the art of reclaiming rubber such as is found in old tires, tubes or other manufactured articles composed largely of rubber. It is general practice in preparing rubber for manufacture into automobile tires or other articles, to incorporate with and into the rubber certain foreign ingredients for the purpose of improving its quality, to meet the special requirements of use, or to cheapen it, or to color it, or to facilitate the process of manufactures, etc. One such ingredient, suphur, is always chemically combined with the rubber, making of it "vulcanized rubber" and usually there is more or less "free" sulphur, which is not chemically combined with the rubber. Cotton is nearly always in automobile tires. Such foreign ingredients comprise what are technically known as "fillers", "pigments", "accelerators", etc., (and also cotton in the case of tires). Such augmented rubber is practically valueless for any purpose except that for which it was especially made, and when such manufactured article is worn out, it becomes waste material.

The object of my process is to remove from such worn out articles, or waste rubber material, or rubber scrap, such an amount of the admixed foreign ingredients as to leave the recovered or "reclaimed" rubber sufficiently free of them, and in such condition as regards elasticity, deformability, and other qualities pertaining to rubber, as to permit of its being advantageously and profitably worked up again into new rubber articles, and to permit of the re-adding of such foreign ingredients as may be necessary to adjust it to its new use.

In its general nature my process is based on certain peculiarities of the solvent action of hot kerosene oil, under controlled and regulated conditions, upon rubber compound, and the present process embodies, in its generic nature, the treatment of the rubber where it is desired to obtain the rubber free of solid fillers as well as other impurities, and the process is carried out as follows, viz:

1. The rubber compound is ground by any adequate grinding method, to pass a screen of 16 meshes to the inch, or finer or coarser as desired.

2. The ground rubber compound is placed in a vessel suitable for heating with sufficient kerosene oil to cover it, which oil is replenished as it soaks into the rubber compound, so as to keep constantly a considerable excess of oil over the rubber compound.

The mixture of kerosene oil and rubber compound is maintained at a temperature varying from 120 to 190 degrees on the centigrade scale, the exact temperature to be employed in each case being determined by the solubility or relative insolubility of the vulcanized rubber contained in the compound, the more highly vulcanized varieties requiring a higher temperature for their solution than the others. The time required for complete solution or dissolving of the vulcanized rubber varies from one-half hour to three hours, and the mass of rubber compound and kerosene oil is kept constantly stirred or otherwise agitated to prevent overheating of the rubber by contact with the hot metal of the vessel.

It is advantageous, after everything possible has been dissolved out of the rubber compound, and before the vulcanized rubber itself begins to dissolve, to change from the old solution to clean kerosene oil. This facilitates the solution of the vulcanized rubber, and makes it possible to produce a purer rubber at the end, because of certain small amounts of impurities caught and imprisoned in the rubber as it is precipitated as described later.

3. When the vulcanized rubber is all dissolved, the mass can either be left to stand, allowing all solid impurities to settle out, or it may be filtered.

4. To the cooled kerosene solution is added a sufficient amount of alcohol or other precipitant, to precipitate the vulcanized rubber out of solution, the alcohol or other precipitant being caused to mix with the kerosene oil by addition of a sufficient amount of some third substance, in which kerosene oil and alcohol or other precipitant are mutually miscible, as carbon bisulphide, carbon tetrachloride, benzol, etc., the vast bulk of the impurities, originally in the rubber compound, and now in solution in the kerosene oil, being left in the kerosene after the addition of the alcohol or other precipitant, thus affording a means of separating the vulcanized rubber from the impurities.

5. The precipitated vulcanized rubber having settled, the kerosene oil is poured or drained off, and the vulcanized rubber further purified by re-solution in carbon bisulphide or other solvent, and re-precipitation by alcohol or other precipitant, which re-solution and re-precipitation may be repeated as desired.

6. The purified vulcanized rubber is dried to free it from solvent and alcohol, etc.

7. All oil and solvents and alcohol, etc., used to be recovered from their mixtures of each other by fractional distillation for re-use.

From the foregoing description it is thought that my invention will be readily understood by those skilled in the art.

What I claim is:

1. The process of reclaiming rubber which consists in comminuting the mass from which the rubber is to be reclaimed, placing the comminuted mass in a bath of kerosene oil and heating the same to a temperature of from 120° C. to 190° C. for a sufficient time to dissolve the rubber and suspend the insoluble impurities present, separating the insoluble impurities from the solution and allowing the solution to cool, precipitating the rubber from the cooled solution and separating the precipitate from the vehicle, purifying the precipitate by dissolving it in a volatile solvent, such as carbon bisulphide and then re-precipitating it by the action of a precipitant such as alcohol, and finally drying the rubber precipitate.

2. The process of reclaiming rubber which consists in the following steps: (1) comminuting the mass from which the rubber is to be reclaimed, (2) treating the comminuted mass to a bath of kerosene oil of from 120° C. to 190° C. until all impurities possible have been dissolved or suspended in the oil, separating the rubber from the vehicle before the rubber starts to go into solution and re-immersing it in a bath of fresh kerosene oil, maintaining the temperature of the bath within the limits above stated until the rubber has been dissolved, (3) after the rubber has been dissolved, removing the solid impurities present and permitting the solution to cool, (4) adding to the cooled solution sufficient alcohol or other precipitant and a third substance which is mutually miscible with alcohol or other precipitant and kerosene oil to cause the precipitation of the rubber, causing the rubber to separate from the vehicle and thereafter treating the precipitated rubber to free it of any contained or adhering solvent.

3. The process of reclaiming rubber which comprises the following steps: (1) comminuting the mass from which the rubber is to be reclaimed, (2) placing the comminuted mass in a bath of kerosene oil and maintaining the temperature of the bath from 120° C. to 190° C. until the mass is dissolved, (3) permitting the dissolved mass to cool, removing the solid impurities in any desired way as by settling or filtration, etc. (4) then adding to the cooled solution a sufficient amount of alcohol or other precipitant to precipitate the vulcanized rubber out of solution and causing the alcohol or other precipitant to mix with the kerosene oil by the addition of a sufficient amount of a third substance in which kerosene oil and alcohol or other precipitant are mutually miscible as carbon bisulphide, carbon tetrachloride, benzol, etc. for examples, (5) causing the vulcanized rubber precipitate to separate from the vehicle and further purifying the vulcanized rubber precipitate by re-solution in a suitable solvent such as carbon bisulphide for example and re-precipitating by alcohol or other precipitant until the rubber is purified, (6) and then drying the rubber to free it from solvent and alcohol.

GEORGE J. MILLER.